US011233876B2

(12) United States Patent
Aluvala et al.

(10) Patent No.: US 11,233,876 B2
(45) Date of Patent: Jan. 25, 2022

(54) USER PROFILE DISTRIBUTION AND DEPLOYMENT SYSTEMS AND METHODS

(71) Applicant: VMWARE, INC., Palo Alto, CA (US)

(72) Inventors: Suman Aluvala, Bangalore (IN); Ramani Panchapakesan, Bangalore (IN); Pushkal Maheshwari, Bangalore (IN); Mahesh Ashok Kavatage, Bangalore (IN); Pavan Rajkumar Rangain, Bangalore (IN); Erich Peter Stuntebeck, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/802,601

(22) Filed: Feb. 27, 2020

(65) Prior Publication Data

US 2021/0211521 A1 Jul. 8, 2021

(30) Foreign Application Priority Data

Jan. 2, 2020 (IN) .............................. 202041000116

(51) Int. Cl.
*H04L 29/08* (2006.01)
*H04L 29/06* (2006.01)
(52) U.S. Cl.
CPC ............ *H04L 67/34* (2013.01); *H04L 63/123* (2013.01); *H04L 67/306* (2013.01)
(58) Field of Classification Search
CPC ............... H04L 29/06; H04L 29/08072; H04L 29/08981; H04L 41/0806; H04L 41/12; H04L 41/082; H04L 41/0213; H04L 41/22; H04L 67/306; H04L 63/123; G06F 8/65; G06F 9/4416
See application file for complete search history.

(56) References Cited

U.S. PATENT DOCUMENTS

| | | | | |
|---|---|---|---|---|
| 2008/0134220 A1* | 6/2008 | Weiss | ...................... | G06F 9/445 719/329 |
| 2013/0275746 A1* | 10/2013 | Gladwin | ............. | G06F 21/6218 713/153 |
| 2016/0295618 A1* | 10/2016 | Kimura | ............... | H04W 68/005 |
| 2018/0260553 A1* | 9/2018 | Hoyos | ...................... | G06F 21/34 |
| 2018/0352430 A1* | 12/2018 | Mansour | ............... | H04L 63/083 |
| 2020/0045051 A1* | 2/2020 | Bathen | ................ | H04L 63/0838 |

* cited by examiner

*Primary Examiner* — Abdullahi E Salad
(74) *Attorney, Agent, or Firm* — Clayton, McKay & Bailey, PC

(57) ABSTRACT

A first server can generate user profiles and receive requests from user devices for enrollment in a first server-managed system that includes user groups. The first server can provide a unique key to a user device during an enrolment process based on a user group the user device is assigned to. The first server can include an enrollment notification for the user device in a first notification transmitted to a messaging service. The messaging service can transmit a second notification to the user device, and the user device can request a user profile from a second server based on second server access information included in the second notification. The second server can use the unique key to access user profile information which it transmits to the user device based on the request. The user device can access the user profile from the profile information using the unique key.

20 Claims, 5 Drawing Sheets

USER PROFILE DISTRIBUTION AND DEPLOYMENT SYSTEMS AND METHODS

RELATED APPLICATIONS

Benefit is claimed under 35 U.S.C. 119(a)-(d) to Foreign Application Serial No. 202041000116 filed in India entitled "USER PROFILE DISTRIBUTION AND DEPLOYMENT SYSTEMS AND METHODS", on Jan. 2, 2020, by VMWARE, INC., which is herein incorporated in its entirety by reference for all purposes.

BACKGROUND

Enterprises sometimes divide employees into different groups based on the employees' roles and responsibilities. In turn, different groups of employees often require specific suites of computing capabilities with respect to end-user devices utilized to fulfill respective roles and responsibilities. An enterprise may provide members of particular groups with specific capabilities needed through the distribution and deployment of customized profiles ("profiles" or "user profiles") on the end-user devices utilized by employees of those particular groups.

User profiles can define, for example, a set of applications, groups of documents, and security requirements that a user can use, access, or must adhere to in the context of using a device to perform their respective duties. Profiles can include certain drivers, software, or OS packages for installation specific to the duties of a particular employee, which may be specific to the employee's organizational group. In addition, profiles may be customized based on one or more aspects of an end user device including ownership, a primary OS, and installed hardware. By providing customized group-specific user profiles, an enterprise may be able to better optimize its computing resources by providing certain organizational groups only with needed applications, documents, permissions and other computing capabilities. This can reduce wastes in time, money, and resources associated with sending a data package that installs applications, files, and other elements to devices for a large number of employees that never use the elements.

Enterprises increasingly employ Mobile Device Management ("MDM") or Enterprise Mobility Management ("EMM") systems to allow an enterprise to exercise varying levels of control over devices, even when those devices are employee-owned. These device management systems may distribute and direct the deployment of profiles on end-user devices. Certain core hardware, software, and cloud computing resources ("core computing resources") often define or substantially support an infrastructure of an overall computing system broadly employed by an enterprise for communication, production, and administration. These same core resources are often responsible for not only configuring, but also distributing, and, in some cases, directing the deployment of user profiles across organizational groups of the enterprise.

However, distribution of user profiles, alone, even to one organizational group, can substantially tax core computing resources for an enterprise. Profile distribution can involve transmitting large packages of data to thousands of user devices over a network, especially with large enterprises having different groups that include thousands of employees. It is not uncommon for the distribution of profiles alone to take days. Bottlenecks can result because of this delay, especially in cases where a particular EMM or MDM solution must be deployed through profiles for an enterprise that has hundreds of thousands of devices. This can also result in certain members of a group having access to certain resources or updated files before other members, which can complicate various collaborative processes or correspondence, for example.

While profiles are being distributed, performance of other functions and systems supported by the core computing resources may suffer for lack of capacity. To compound this issue, deployment of a profile on each user device for an organization device may require some type of authentication process between the devices and the core computing resources. Accordingly, a capacity of the core computing resources to perform functions it is responsible for may further be reduced. In addition, profiles may be updated frequently in conjunction with, for example, new roles and responsibilities being assigned to organizational groups or security updates when employees join or leave organizational groups. Thus, the core computing resources may be taxed by distribution and deployment processes substantially and often.

As a result, a need exists for systems and methods that efficiently distribute and deploy user profiles on user devices to reduce loads on computing resources.

SUMMARY

Examples described herein include systems and methods for distributing and deploying user profiles to end-user devices. In one example, a first server can receive requests from user devices for enrollment in a system managed by the first server. The first server can be configured to manage the system, in part, by managing user groups which correspond to different groups of users that access the system with their end-user devices to perform their various respective duties. Management of each user group can include defining and configuring a user profile to be implemented on the user devices used by the members of a particular user group. In one example, the first server can generate and assign a unique key to each user group, and cause unique keys to be installed on end-user devices based on the user groups that the user devices are respectively associated with.

Once a first server receives an enrollment request from a user device, the first server determines a user group for that user device and identifies a unique key for the user group to be installed on the user device. In addition, the first server can transmit a first notification to a messaging service. The first notification can include an enrollment notification for the user device. Transmittance of the first notification can be part of a process implemented by the first server to cause a user profile to be accessible to the user device through a second server.

More specifically, a user profile can be accessed by a user device through the second server based on the user device receiving a second notification from a messaging service, as a result of the messaging service receiving a first notification. The user device can communicate with the second server based on second server access information obtained from the second notification. Once communication is established, the user device can use, or cause the second server to use, the now-installed unique key to access the user profile. In turn, the second server can cause profile information to be provided to the user device, and the user device can access the user profile from the profile information by using the unique key.

In one example, second server access information can be included in a first notification from a first server to a messaging service, and again included in a second notification from the messaging service to the user device. The second server access information can include at least a portion of a universal resource locator ("URL") that is associated with, and capable of being used to access, a second server. In one example, the URL is included with the first notification to the messaging service, and transmitted to a user device in a second notification generated by the messaging service.

A second server can receive a unique key from a user device and use the unique key to identify profile information that corresponds to a user profile for a user group that the user device has been assigned to. The second server can obtain and transmit the profile information to the user device. As a result of receiving the profile information, the user device can decrypt the profile information with the unique key, and obtain the user profile for implementation. In another example, the user profile can be received by the second server as the profile information from a first server prior to an identification process, which can include searching one of a storage and a memory for the second server based the unique key received from the user device.

In another example, a user device can transmit a profile request to a second server based on receiving a second notification from a messaging service, which received a first notification from the first server when the user device was enrolled. The profile request can include the certificate and a unique key. In one example, the second server can verify the user device is assigned to a user group associated with the unique key based on the certificate. Once verification is performed, the second server can search for and obtain profile information using the unique key.

In yet another example, a first server can partition user profiles into segments and transmit profile segments to enrolled user devices that are assigned to user groups managed by the first server. In particular, the first server can partition a first user profile into, for example, three segments, and transmit each segment to a different designated user device included a first user group to which the first profile is assigned. In one example, a new or not-up-to date user device that should be or is part of the first user group, can transmit a request to the first server for enrollment or to be updated. Based on the request, the first server can provide the requesting user device with the first unique key. In addition, the first server can provide, directly, through the designated user devices, or through the requesting user device, designated user device information to a second server.

In example where a first server provides designated user device information to a second server directly or through designated user devices, the second server may also receive unique keys associated with different user groups. The second server may receive a profile request from a user device, verify the user device according to a unique key provided by the user device, and provide the user device with designated user device address or communication information. In turn, the user device may obtain profile segments from designated user devices. In one example, each of the designated user devices can implement a verification process using unique keys.

In examples where a first server provides designated user device information to a second server through a requesting user device, the second server can request the profile segments from the designated user device using the first unique key provided to the second server by the requesting user device. In one example, the requesting user device can receive the profile segments in a package from the second server, and combine the segments using the first unique key.

Thus, a user device may obtain a user profile that is managed by a first server, which is a core computing resource, through a second server, which is not a core resource. Accordingly, the systems and methods described herein can be implemented to distribute away from core computing resources a load associated with delivering user profiles to a large number of devices. This can also be implemented by third parties that handle management and distribution of user profiles for an enterprise externally through software as a service ("SAAS") environments the third parties may provide.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 3 is a sequence diagram of an example method for distributing a user profile to a user device based on a user group the user device is assigned to.

FIG. 4 is a sequence diagram of an example method for distributing a user profile to a user device based on a user group the user device is assigned to.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

A first server can generate user profiles and receive requests from user devices for enrollment in a first server-managed system that includes user groups. The first server can provide a unique key to a user device during an enrolment process based on a user group the user device is assigned to. The first server can include an enrollment notification for the user device in a first notification transmitted to a messaging service. The messaging service can transmit a second notification to the user device, and the user device can request a user profile from a second server based on second server access information included in the second notification. The second server can use the unique key to access user profile information which it transmits to the user device based on the request. The user device can access the user profile from the profile information using the unique key.

Figure 1:
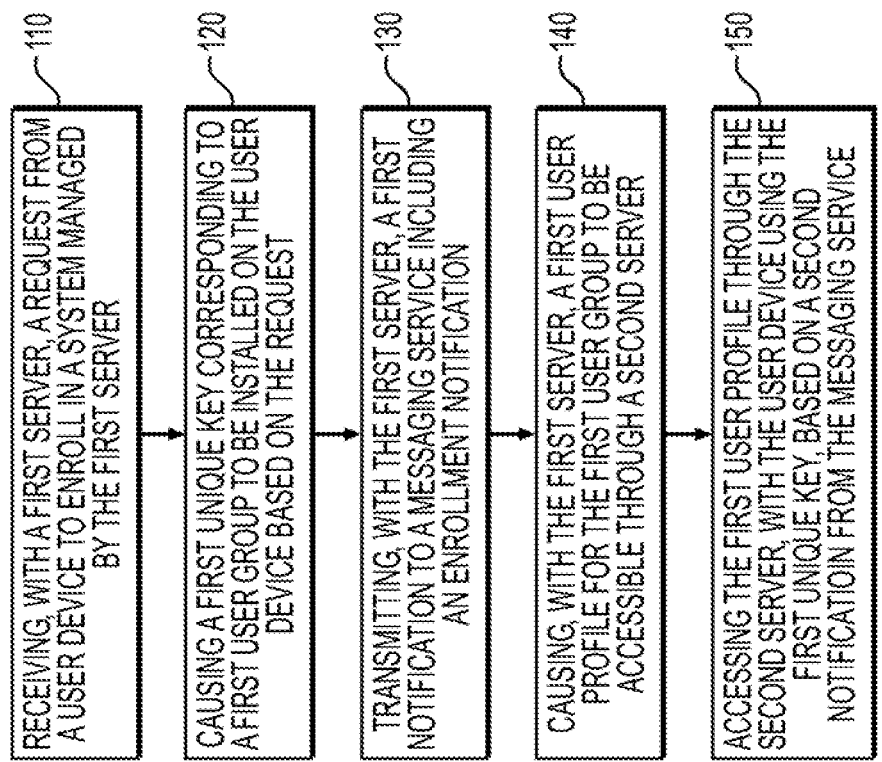
FIG. 1 is a flowchart of an example method for distributing user profiles for an enterprise.
Figure 2:
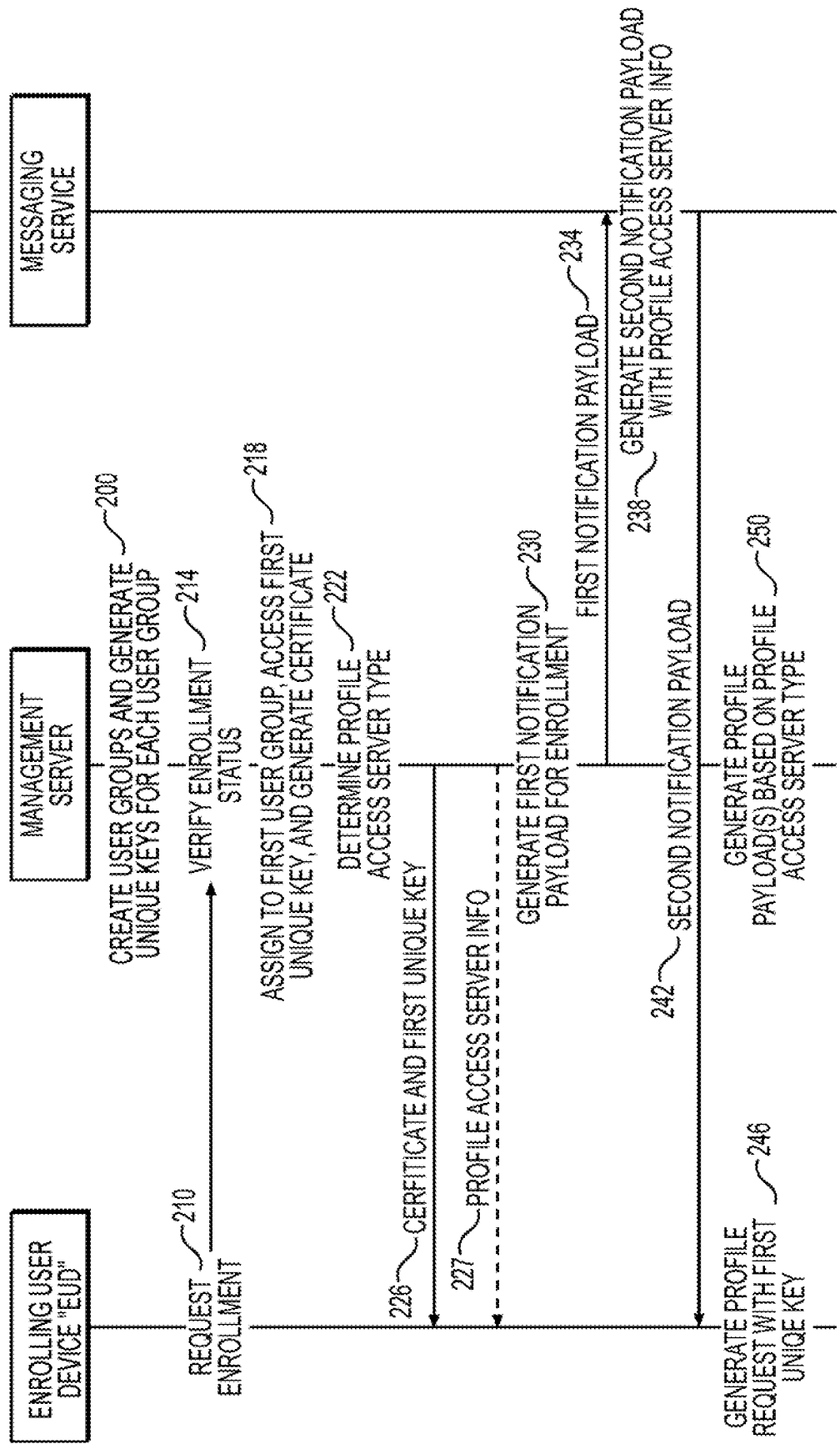
FIG. 2 is a sequence diagram of an example method for enrolling user devices for an enterprise and assigning the user devices to specific user groups.
Figure 3:
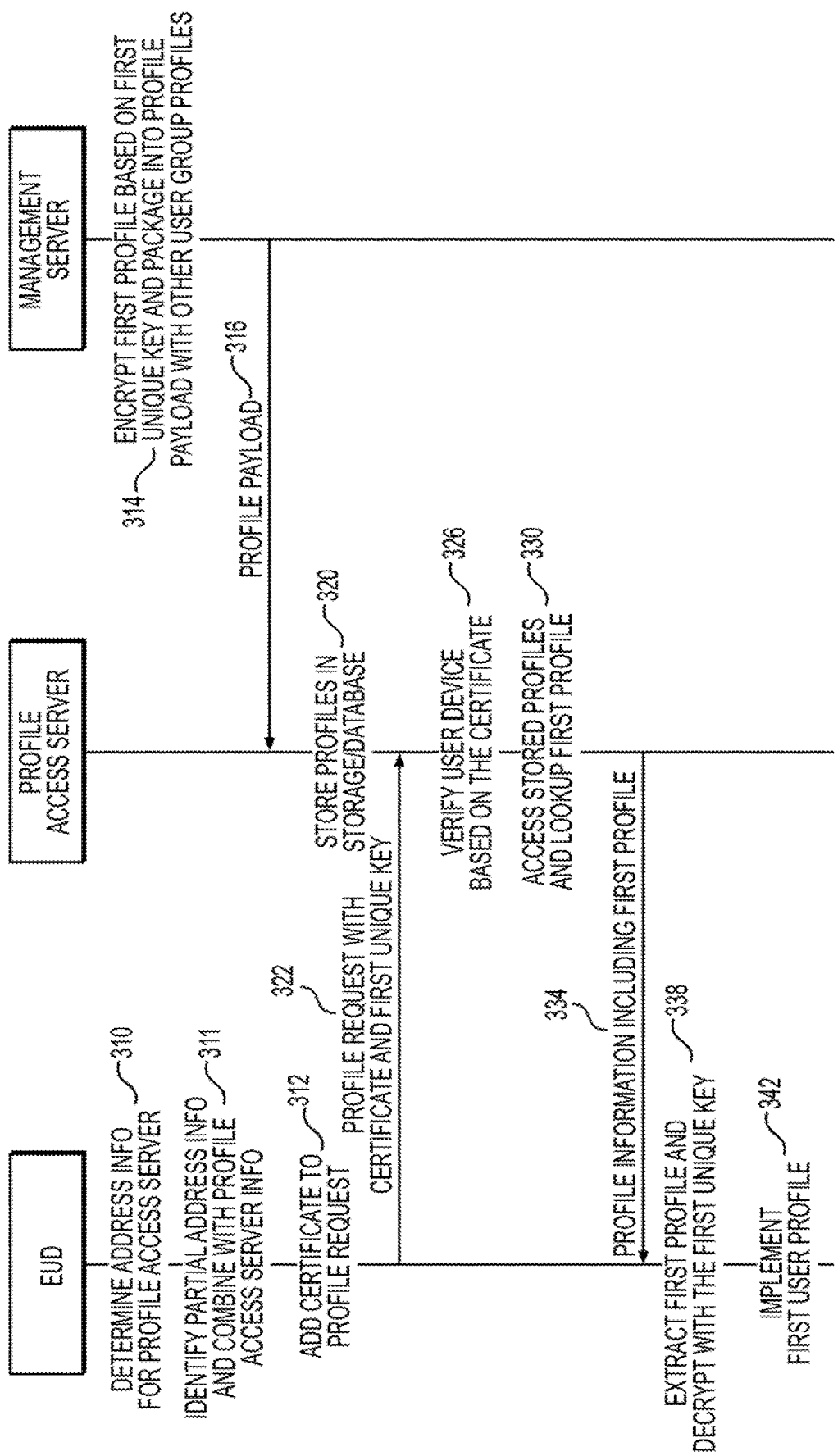
Figure 4:
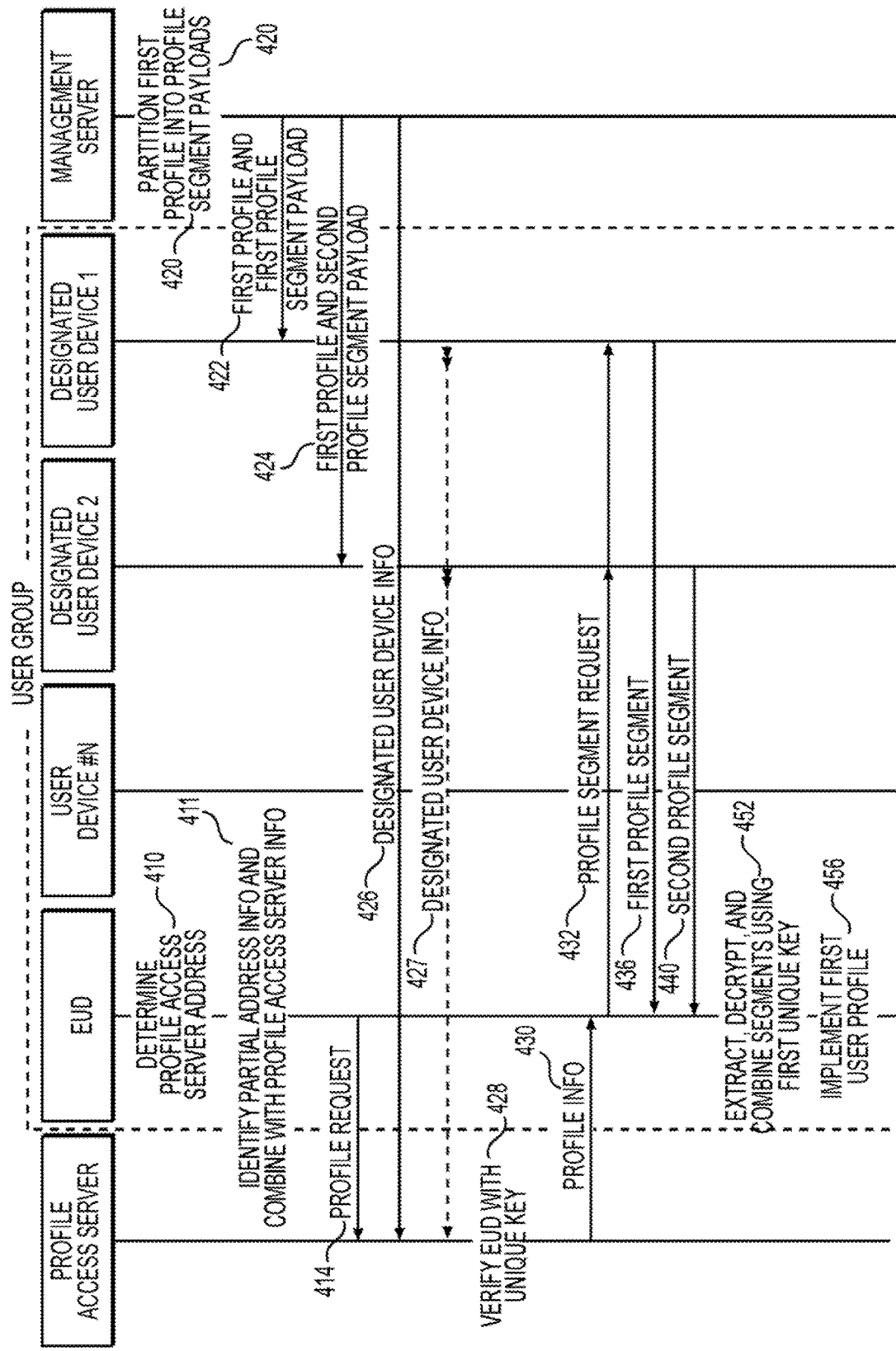
Figure 5:
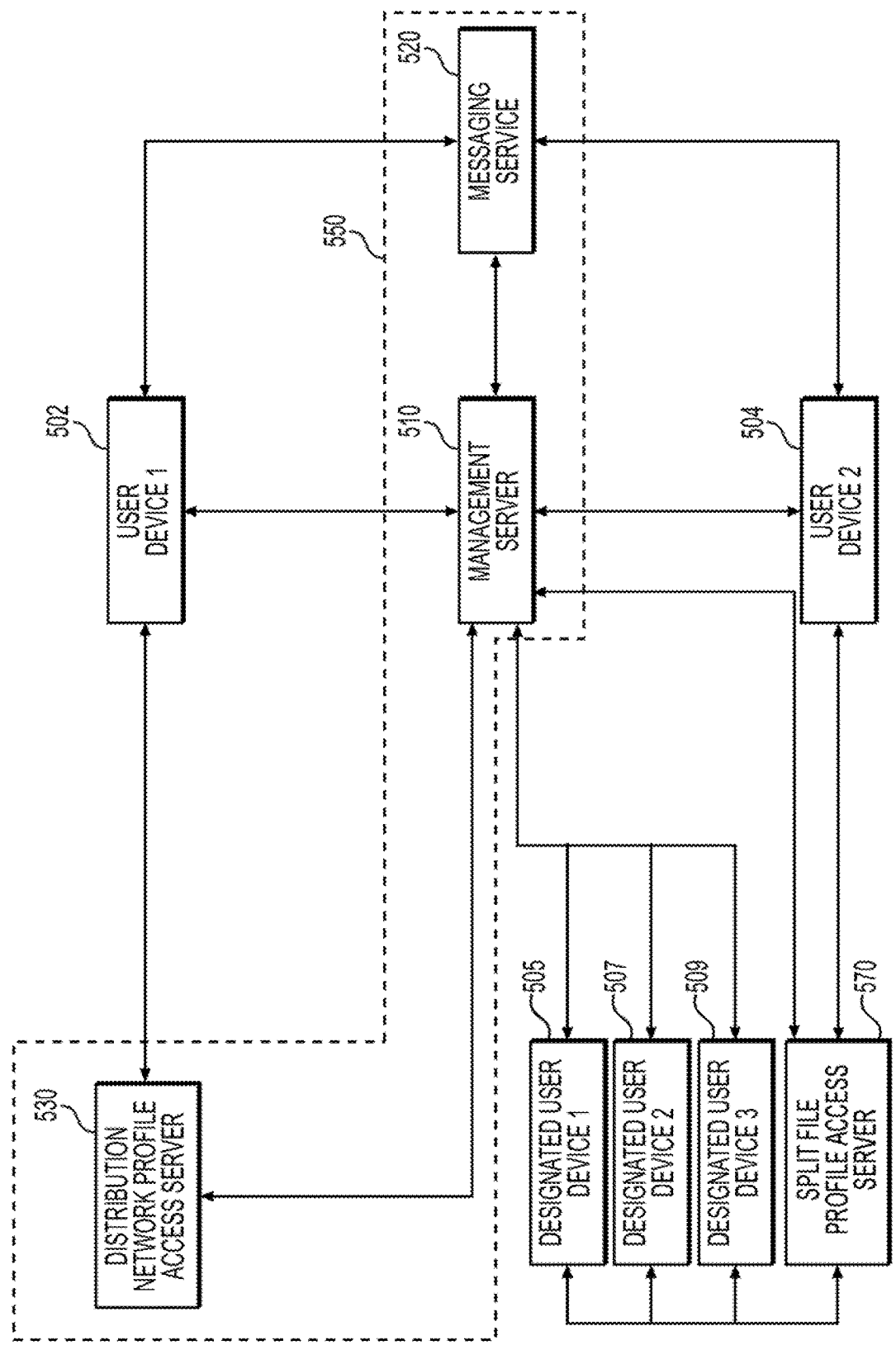
FIG. 5 illustrates a schematic representing exemplary system components and communications between system components for distributing user profiles.

FIG. 1 is a flowchart of an example method for distributing user profiles with a first server that assigns the user profile to a user device based on a user group assignment, and causes the user device to access the user profile through a second server. FIG. 2 provides a detailed sequence diagram for an aspect of the method of FIG. 1 directed toward enrolling a user device with a server that manages a system including user groups. FIG. 3 provides a detailed sequence diagram for a version of the method of FIG. 1 directed toward distributing a user profile to a user device that accesses the user profile through a second server that receives the user profile form a first server. FIG. 4 provides a detailed sequence diagram for a version of the method of FIG. 1 directed toward distributing a user profile to a user device that accesses a partitioned version of the user profile through a second server that receives segments of the user profile from designated user devices. FIG. 5 illustrates a schematic representing exemplary system components and communications between system components for implementing the methods described herein.

FIG. 1 is an example method for distributing user profiles to end-user devices. At stage 110, a first server can receive a request from a user device to enroll in a system managed by the first server. It will be understood that in one example, the first server can perform or provide at least those core services normally performed by, or associated with, the responsibilities of a management server.

In one example, the request can be generated when a user attempts to login to the managed system with the user device. The user can provide credentials, such as a username, identification number, a static password, a time-based one-time password, or the like, as part of a logon or sign-in process. In one example, different or more than one of the above types of credentials can be required for an initial logon by a user, or an initial logon on a particular user device by a user that previously signed-in to the system with another user device.

In one example, the first server can be one or more servers configured to manage the system, in part: (1) by establishing and maintaining user groups for the system; and (2) defining a user profile for each user group. Each of these user groups can be assigned a unique key for enabling user devices assigned to a particular user group to access a user profile defined for that user group. The unique key can be a key that employs a cryptographic algorithm that uses the same keys for encryption and decryption in one example. In keeping with this example, the unique key may a be symmetric key for which a symmetric-key algorithm uses the same cryptographic keys for both encryption of plaintext and decryption of ciphertext.

At stage 120, the first server can cause a first unique key that corresponds to a first user group to be installed on the user device that requested enrollment at stage 110. In one example, the first user group can be selected from the user groups by the server based on information provided in the request. In one example, the unique key is sent to the user device at stage 120 as part of a setting for a software development kit ("SDK") being implemented by an agent (such as an MDM agent), or a first server-managed application, running on the user device.

In one example, the credentials provided in a logon process, or user-specific information provided through a series of prompts by the first server or an agent operated on the user device, can be used to determine what user group the user device will be assigned to. In this example, the first server can identify a user that has logged on, or provided server requested information, and determine what organizational group that user is part of. In another example, the first server can host or manage a database or other data storage element in which user organization/user group information is maintained and may be updated by administrators. The first server can check the logon or other user identifying information against the user group information in the database and determine the user group that the employee/ employee's devices are part of.

In another example, the first server can recognize, or request, device-specific information or identifiers, to determine that the particular device performs a certain function that is only performed by devices assigned to a particular user group, or used by users that are part of a particular organizational group. For example, the user device could be configured to or otherwise responsible for running an application or a group of applications (such as one or more "line of business" applications) implementing an SDK tailored to activities most often performed by a particular group of employees that share use of the user device.

In either scenario described above, the first server can identify a user group for the user device based on the information provided or recognized during a logon or sign-in procedure. With the user group known, the first server can subsequently retrieve the unique key for the user group identified directly based on the provided information, or by identifying a corresponding organizational group. The retrieved unique key can then be transferred to the user device requesting enrollment.

At stage 130, the first server can transmit a first notification to a messaging service. The first notification can include an enrollment notification for the user device, and second server access information. In one example, the second server access information can include a URL, or other type of address information, for a second server that the user device can utilize to communicate with the second server and request a user profile. In another example, the second server access information in the first notification can include partial address information that the user device may combine with other partial address information provided by the first server with the first unique key at enrollment.

In another example, the first notification can also include the first unique key or the certificate, which may eventually be sent to the user device in a second notification the user device receives from the messaging service. In this example, the unique key or certificate received may be used by the user device to verify the messaging service is a trusted source of information, or is otherwise providing the user device with appropriate information specific to a user group the user device has been assigned to.

At stage 140, the first server, through communications to the messaging service and the user device, causes a first user profile for the first user group to be accessible by the user device through the second server.

In one example, the first server can transmit unique-key encrypted user profiles, including the first user profile, to a second server at stage 140. In this example, the second server may constitute a distribution network server within a computing infrastructure for an enterprise. In another example, the first server can partition a first user profile into segments and transmit the segments to designated user devices at stage 140. The first server can also transmit address or other identifying information about the designated user devices to a second server. In this example, the second server may constitute a split file server and directs the user device to the designated user devices in accordance with the information received from the first server.

At stage 150, the user device can access the first user profile through the second server based on a second notification from the messaging service. More specifically, the user device can use the first unique key and second server access information to access the first user profile.

In one example, where a first user profile is stored or otherwise hosted by a second server, second server access information in the second notification includes part or an entirety of an address for the second server. Based on this information and any address information provided to the user device by the first server, the user device can communicate with the second server by sending a profile request. The profile request can include the certificate and the first unique that the second server respectively uses to verify the user device, and locate the first user profile so that it can be transmitted to the user device In another example, where the first user profile is partitioned into segments and distributed to designated user devices, second server access information in the second notification includes part of, or an entirety of, an address for the second server that is provided as a split file server. The second server, having the designated user device information, can transmit this information to the user device so that the user device can communicate with each designated user device to obtain respective profile segments housed on each designated user device.

FIG. 2 is an exemplary method of enrolling user devices in a managed system that includes one or more management servers that maintain user groups as part of managing the system.

At stage 200, a pre-enrollment process may be executed by a management server. The management server, which may provide a core computing resource for an enterprise or third party that manages core aspects of an enterprise's computing infrastructure, can take an inventory of current owned and managed user devices and identify users, or specific functions in the case of shared devices, associated with each of the devices. The management server can mine for and use information about the users and specific functions that reflects what organizational groups the users, or shared devices associated with particular functions, belong to, and create user groups that correspond to those organizational groups. With the user groups created, the management server can generate or otherwise define a user profile a unique key for each user group. In addition, the management server can assign each user device, or shared device, to a user group corresponding to an organizational group associated with a user of the user device, or a function performed by the shared device.

At stage 210, a management server ("management server" or "first server") can receive an enrollment request from an enrolling user device ("EUD"). In response, the management server can verify an enrollment status for the EUD at stage 214, as discussed above with respect to stage 110.

At stage 218, the management server can assign the EUD to a first user group, access a first unique key associated with the first user group, and generate a certificate based on the verification in stage 214. In one example, the generated certificate can be specific to the user of the EUD. In another example, the certificate can be device specific.

At stage 222, the management server can determine, or otherwise acknowledge, a type of server that is to be used to enable the EUD to access the first user profile. In one example, a profile access server ("profile access server" or "second server") can be a distribution network server that stores or otherwise hosts encrypted user profiles. In another example, the profile access server can be a split file server that directs a process for a user device to obtain different portions of a file, for example, from computing devices in addition to or other than the profile access server.

At stage 226, the management server can transmit the certificate and the first unique key to the EUD. In one example, the management server can transmit a server information for the profile access server, through which the EUD will access the first user profile as described in more detail with respect to FIGS. 3 and 4.

In addition to the certificate and the unique key, the management server can instruct or guide the EUD through an enrollment process that includes installing a management agent on the user device. In one example, the management agent may continuously communicate with, and be controlled by, the management server or a hypervisor controlled by the management server. In another example, the process discussed hereafter as being performed or executed by the EUD can be carried out by the management agent installed on the enrolling device.

At stage 230, the management server can generate a first notification payload that is transmitted to a messaging service in stage 234. The first notification payload can include an enrollment notification, part or an entirety of address information for a profile access server, the first unique key, and instructions to generate a second notification payload. The instructions can further direct the messaging service to transmit the second notification to the EUD. At stage 238, the messaging service can generate a second notification payload that is transmitted to the EUD in stage 242.

At stage 246, the EUD can generate a profile request that includes the first unique key and, based on the content of the second notification payload, additional information that is used by a profile access server.

At stage 250, the management server can generate profile payload(s) based on a profile access server type. In one example in which the profile access server is determined to be a distribution network server, the profile payload can include at least the first user profile encrypted according to the first unique. In another example in which the profile access server is determined to be a split file server, stage 250 can include the management server partitioning the first user profile into segments. Each segment may be encrypted according to the first unique key.

FIG. 3 is an exemplary method of distributing user profiles to user devices through a distribution network profile access server. At stage 310, the EUD can determine address information for a profile access server based on the first notification from the messaging service. In one example, the EUD can identify partial address information in the first notification. This partial address can be a partial URL that the EUD can combine with another portion of the URL address that was optionally included in profile access server information that was included by the management server with the first unique key.

At stage 312, the EUD can generate a profile request that includes a certificate issued by the management server along with the first unique key, as described in stage 226 of FIG. 2.

Stages 314, 316, and 320 can be performed before during or after any or all of stages 310, 311, and 312. At stage 314, the management server can encrypt a first profile based on the first unique key, and the package the now-encrypted first profile with other user group-specific encrypted user profiles in a profile payload, such as the one generated in stage 250 of FIG. 2. Execution of stage 314 depends from the content of the profile payload generated in stage 250, which depends from the type of server a profile access server is identified as in stage 222.

At stage 316, the management server can transmit the profile payload to a profile server that provides a distribution network server for the system managed by the first server. At stage 320, the profile access server can store the encrypted user profiles in a storage location on the server. In another example, the encrypted user profiles can be stored in a database maintained on a separate server that is in communication with the profile access server.

At stage 322, the profile access server can receive a profile request completed by the EUD in stage 312. As noted above, the profile request can include the first unique key and the certificate obtained by the EUD in stage 226.

At stage 326, the profile access server can verify the EUD based on the certificate received in stage 322. In one example, the profile access server can communicate with the management server to verify that the EUD is authorized to receive a user profile. In particular, the certificate can be used by the profile access server to establish a secure connection with the enrolling device. In another example, the profile access server can check for a revocation status of the certificate. In yet another example, a user group that implements the first profile can be specified in the profile request, and the profile access server can communicate with the management server to verify that the EUD is indeed assigned to the identified user group.

At stage 330, the profile access server can access the user profiles stored in stage 320, either internally or externally, and use the first unique provided in the profile request to retrieve the first user profile.

At stage 334, the profile access server can transmit profile information to the EUD. In this example, the profile information comprises at least an encrypted version of the first user profile.

At stage 338, the EUD can extract the first user profile from the profile information and decrypt the first user profile using the first unique key. At stage 342, the EUD can implement the first user profile. Stages 338 and 342 can constitute the deployment of the first user profile on the EUD. As the processes in these stages are executed, the EUD can communicate with the management server with progress updates, or in one example provide a single notification when the first user profile is deployed.

FIG. 4 is an exemplary method of distributing user profiles to user devices through a split file profile access server. At stage 410, the EUD can process the second notification received from the messaging service to identify profile access server address information. As described below with reference to stages 420, 422, and 424, the management server may partition the first user profile into segments, and send each segment to a designated user device. In one example, the designated user devices can be part of the same user group as the enrolling user group. In another example, one or more of the designated user devices can be part of a user group different from a user group for another one or more of the designated user devices.

In one example, the second notification includes profile access server address information. This information can be encrypted according to the first unique key. In another example similar to the method of FIG. 3, a portion of the profile access server address information could have been included in stage 227. Accordingly, at stage 411, this partial address information may be combined by the EUD with partial address information included in the second notification from the messaging service.

At stage 414, the EUD can request a user profile from the profile access server based on the information gleaned in stage 410 from the second notification. The first unique key can be included in the profile request. In the exemplary method of FIG. 4, the profile access server can be a split file server. In one example, a split file server implements a communication protocol, such as the BITTORRENT protocol, for peer-to-peer file sharing that can be used to distribute data and electronic files over a network, such as the internet or an enterprise's intranet. In one example, the communication protocol can include or support a system in which a file, that may constitute or include a user profile, is divided into segments that are distributed to different computing devices ("peers").

At stage 420, the management server can partition the first user profile into segments as a result of the type profile access server previously determined in stage 222. In particular, the management server determined at stage 222 that the profile access server followed a split file communication protocol as previously discussed. In the example of FIG. 4, the first user profile is partitioned into a first segment and a second segment. However, it will be understood that the first profile could be partitioned into more segments. In one example, the number of segments can depend from a total number of user devices in a user group. In addition, at stage 420, the first and second segments can be encrypted according to the first unique key for the first profile.

At stage 422, the management server can transmit a payload including the first profile and a first profile segment to a first designated user device. The first profile can optionally be included in this payload in the event that designated user device 1 is not implementing the first user profile, or is implementing a version of the first user profile that has since been updated. At stage 424, a payload including a second profile segment can be transmitted by the management server to a second designated user device as illustrated in FIG. 4. Stage 424 can occur or be performed before, after, or at the same time as stage 424. In another example, stage 420 can include the management server transmitting the user profile to the profile access server, which partitions the profile and transmits the different segments to the designated user devices.

Information regarding which user devices are designated can be generated at the time the management server determines a profile access server type at stage 222 of FIG. 2. In particular, in one version of stage 222, the management server can survey information regarding user devices that are part of a user group that the EUD is assigned to, or another user group, and select which user devices will serve as designated user devices. In one example, the selection can be based on various factors such as a strength or a reliability of a connection between a profile access server and a potential designated user device.

At stage 426, the management server can transmit the designated user device information (identity and address) to the profile access server. In one example the designated user device information can include the first unique key. In another example, each of the segment payloads respectively distributed in stages 422 and 424 can include profile access server address information, and instructions for a respective designated user device to identify or register with the profile access server. Accordingly, each of the first and second designated user devices can transmit respective designated user device information to the profile access server at stage 427, which may include the first unique key.

At stage 428, having received the profile request at stage 414, and the designated user device information at stage 426 or 427, the profile access server can execute a verification process with respect to the EUD. In particular, the profile access server can use the first unique key to search and find received designated user device info with a matching unique key. In the method of FIG. 4, the profile access server determines that the first unique key included in the profile request matches, or is symmetric relative to, the unique keys associated with the designated user device information pertaining to the first and second designated user devices. Accordingly, at stage 430, the profile access server transmits profile information to the EUD that includes the designated user device address information. In addition, the profile information can include any additional instructions required for the EUD to communicate according to, and be in compliance with, the communication protocol implemented by the profile access server and the first and second designated user devices.

At stage 432, the EUD can request profile segments from designated user devices identified in profile information. In one example, the first notification transmitted to the messaging service at stage 234 (see FIG. 2) can be delayed until stages 420, 422, and 424 are complete. This can ensure that the designated user devices are capable of responding to the request in stage 432. In another example, where one or more designated user devices do not include a profile segment, a process can be triggered by segment request in which a designated user device requests a profile segment from the management server.

In one example, each profile segment request can specify a particular segment of a profile being requested from a particular a designated user device. In one example, the designated user device information that is ultimately included in the profile information at stage 430 can include identifiers for each segment and identify the designated user device where each segment is to be respectively accessed upon request from the profile access server.

In response to the requests being made in stage 432, the first and second designated user devices can transmit the first and second profile segments at stages 436 and 440, respectively. The first unique key is included in the segment requests in stage 432, and each designated user device can execute a respective verification/key comparison process before responding to the request for a respective segment.

At stages 436 and 440, the first and second designated user devices can respectively transmit the first and second profile segments to the EUD. Following receipt of the profile segments, at stage 452, the EUD can use the first unique key to verify that the received segments correspond to the user profile associated with the first unique key.

At stage 448, the profile access server can transmit the profile information to the EUD. As a result of receiving the profile information in stage 448, the EUD can extract the first and second profile segments from the profile information at stage 452.

In one example, the profile information, as a package of data elements, may be encrypted based on the first unique key. In this example, the EUD can be required to use the first unique key before extraction of individual segments can be accomplished. In another example, the individual profile segments can be separately encrypted in lieu of, or in addition to, an encryption of the profile information according to the first unique key. In another example, the certificate provided to the EUD by the management server in stage 226 could be incorporated in the handling of the profile information once received by the EUD.

Stage 452 can further include the EUD combining the profile segments into the first user profile. In one example, each segment can include metadata or some other form of stored information that refers to, or otherwise maps, how or what the segment is to be combined with. This mapping information can be generated by the management server when the first user profile was partitioned in stage 420. In one example, this mapping information can be encrypted according to the first unique key.

At stage 456, the EUD can implement the first user profile. Stages 452 and 456 can constitute the deployment of the first user profile on the EUD. As the processes in these stages are executed, the EUD can communicate with the management server with progress updates, or in one example provide a single notification when the first user profile is deployed.

The method of FIG. 4 is one example using a split file profile access server to deploy user profiles on enrolling user devices. In another example, the second notification from the messaging service can identify the designated user devices in some form, such as with URL or other identifiers and include instructions on a communication protocol for the profile access server. In this example, the EUD, not the management server, provides the split file profile access server with the designated user device information in a profile request from the EUD to the profile access server. The EUD can be required to use the first unique key in order to access and forward the designated user device information to the profile access server.

Continuing with the above example, the EUD may have been provided with partial designated user device information at stage 226 along with the first unique key. In one example, the partial information may provide access information for less than all of the designated user devices that received a segment of the first user profile. Accordingly, similar to stage 411 for the method of FIG. 4, the EUD can combine the information received from the management server at stage 226 with any designated user device information provided in the second notification from the messaging service. In turn, this combined information regarding the designated user devices can be included in a profile request from the enrolling user device to the profile access server.

In the example in which the EUD provides the designated user device information, the profile access server requests profile segments from designated user devices. Where one or more designated user devices do not include a profile segment, a process can be triggered by the request from the profile access server where that designated user device requests a profile segment from the management server. Otherwise, designated user devices can transmit the respective profile segments to the profile access server in response to the segment request. respectively. A designated user can be configured to request unique keys in response to receiving a profile segment request. The profile access server in this example can respond with the requested unique key. Alternatively, the profile access server can automatically include the first unique key with the profile segment requests. In either process, each designated user device can check the unique key provided against the profile segment being requested.

Continuing further with the recent example, upon receiving the profile segments, the profile access server can combine the segments into a package of profile information. The segments may be combined in the sense that each segment is included as a separate, possibly encrypted, data element within a package of data elements. The profile access server may review the received segments and use the first unique key to verify that the received segments correspond to the user profile associated with the first unique key. Subsequently, the profile access server can transmit the profile information to the EUD, which uses the first unique key to extract, decrypt, and combine segments provided in the profile information. The individual profile segments can be separately encrypted in lieu of, or in addition to, an encryption of the profile information as a package. In another example, the certificate provided to the enrolling user device by the management server in stage 226 could be incorporated in the handling of the profile information once received by the enrolling user device.

According to an aspect of the present disclosure, a user profile is encrypted with a unique key that is specific to a user group, and is delivered to a user device assigned to that user group during enrolment. However, if another user device not part of the above user group was to receive the same user profile, this other user device would not be able to decrypt the user profile since it does not have the unique key for that user profile. The systems and methods described herein improve the security associated with user profiles and reduce a risk of unauthorized access to these user profiles.

Further, additional stages can be incorporated into the methods and systems described herein to protect against issues of data integrity degradation. In one example, a hash function can be included in a message provided to a user device prior to receiving profile information. The same hash function could be included in the user profile included in the profile information. Accordingly, if aspects of the profile information are affected that alter the hash function in the user profile, the receiving user device can recognize that the profile has been potentially corrupted by comparing the hash functions in the push message and the profile. The same procedure can be applied to a hashed value of a profile, key, or any other data, generated by applying the hash function to that data. In another example in which a second server is a distribution network server, as in the method of FIG. 3, a profile can be digitally signed by a second sever before it is encrypted. Once the profile has made its way to a user device, a separate application on the user device can verify the digital signature for authenticity.

In the context of an enterprise with thousands of employees, where changes in organizational group are frequent, the systems and methods of the present disclosure provide significant improvements with respect providing user devices with the correct profiles and limiting unauthorized profile access.

A device for a user, or a function-specific device subject to a change from one organizational group to another (with a different profile), can be re-enrolled in a user-group managing system the next time access to the system is requested through a logon or other credentialed procedure. During re-enrollment, all previous enterprise-related data can be wiped, including any unique key used for decrypting a user profile. Similarly, when a user leaves an enterprise, the user's device, whether enterprise owned or just managed, can be wiped, including any unique key previously installed on the device.

In another example, when a user is moved from one user group to another smart group, which the user or device may not be aware of, a management server can send a settings update notification for removing a certificate for that device. As noted above, settings can be sent during an enrollment process when a unique key is also sent to a device. As part of this setting update, old certificates are removed and new certificates are sent. In the case of an update to a user group, e.g., a user being added or removed, a user profile for the user group can be encrypted with a new unique key and re-deployed. As part of redeployment, a notification can be sent to each user/user device assigned to the particular user group. In yet another example, when a certificate is revoked, a certificate revocation status can be transmitted to a device as well as a distribution network profile access server endpoint. Since certificates are the devices to which they are issued, if a device with a revoked certificate attempts to access a profile through a distribution network profile access server, that server will deny connection.

FIG. 5 is an exemplary diagram of system components. As shown, the system components can include multiple user devices 502, 504 and designated user devices 505, 507, 509 (together "the user devices"), a management server 510, a messaging service 520, and at least one of a distribution network profile access server 530 ("distribution network server 530" or "second server 530") and a file sharing profile access server 570 ("file sharing server 570" or "second server 570"). The management server 510 provides a "first server" as defined herein, and the user devices and second servers 530, 570 can connect to the management server 510 over a network, such as the internet.

Each of the user devices can be any processor-enabled computing device, such as a laptop, tablet, cell phone, personal computer, or the like, that includes one or more processors and memory storage locations. Any or all of the user devices can be part of the system comprising the system components of FIG. 5, as an enterprise-owned device configured to cooperate with the management server 510. In another example, any or all of the user devices can be user-owned and enrolled, or, in the case of a first user device 502 and a second user device 504, in the process of attempting to enroll with the management server 510, as described herein. Thus, any of the user devices may be, or are in the process of becoming, at least partially supervised or managed by the management server 510. Further, each of the user devices can be configured to include a VM client that accesses a virtual session (implements an instance of a virtual machine), or otherwise be configured to access a virtual session.

The management server 510 can include one or more servers that can each provide centralized management of, and operational data gathering from, a respective infrastructure of data entities. Each of these servers can: be a single server or a network of servers; utilize one or more processors and memory stores; provide an administrator with tools to manage an infrastructure; and run one or more software solutions, such as VSPHERE Client, VCENTER SERVER, and VREALIZE Suite. In one example, the management server 510 can provide an MDM or EMM system with which the user devices are enrolled. In another example, multiple servers of the management server 510 can be affiliated with different network locations for handling different types or models of user devices or user groups that each include a respective set of user devices. In yet another example, the management server 510 can host, or manage a server that hosts, a VM in which a user profile is implemented along with a VM agent as services inside a guest OS of a VM/virtual session running on any of the user devices.

Any one or each of the servers 510, 530, 570, can respectively be constituted by one or more servers having one or more processors. In one example, the management server 510 can optionally include, host, or otherwise provide one or both of the messaging service 520 and the distribution network server 530, as indicated with reference numeral 550. In another example, the management server 510 can include one server or a group of servers distinct from the distribution network server 530 and a server that provides the messaging service 520.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method of distributing profiles to user devices, the method comprising:
   receiving, at a first server, a request from a user device to enroll in a system;
   providing a unique key and a certificate to a user device based on the request, wherein the unique key corresponds to a user group associated with a user of the user device;
   encrypting a user profile with the unique key, wherein the user profile is associated with the user group;
   sending, by the first server, the user profile and the certificate to a second server; and
   sending, by the first server, a notification to the user device through a messaging service, wherein the notification includes access information for the second server and instructions to retrieve the user profile from the second server using the certificate.

2. The method of claim 1, wherein the notification is sent as a first notification and a second notification, the first notification including a first portion of the second server access information, and the second portion including a second portion of the second server access information.

3. The method of claim 2, wherein
   the second server access information includes a universal resource locator ("URL") associated with the second server,
   the first notification includes a first portion of the URL,
   the second notification includes a second portion of the URL and the unique key, and
   the user device combines the first and second portions of the URL to provide the second server with the unique key and access the user profile.

4. The method of claim 1, further comprising:
   receiving, at the second server, the a request for the user profile from the user device, wherein the request includes the certificate;
   identifying, by the second server, the user profile using the certificate; and
   sending, by the second server, the user profile to the user device.

5. The method of claim 4, wherein the certificate includes a group identifier of the user group associated with the user device, and the identification includes searching one of a storage and a memory of the second server with the group identifier for the associated user profile.

6. The method of claim 4, further comprising:
   verifying, at the second server, that the user device is assigned to the first user group based on the certificate prior to performing the identification.

7. The method of claim 1, further comprising:
   partitioning, by the first server, the user profile into segments;
   transmitting each of the segments to a respective designated user device for the user group not including the user device;
   transmitting device information corresponding to the designated user devices to the user device; and
   transmitting, to the user device, instructions for retrieving the user profile segments from the designated user devices and combining the segments.

8. A non-transitory, computer-readable medium containing instructions that, when executed by a hardware-based processor, performs stages for distributing profiles to user devices, the stages comprising:
   providing a unique key and a certificate to a user device based on the request, wherein the unique key corresponds to a user group associated with a user of the user device;
   encrypting a user profile with the unique key, wherein the user profile is associated with the user group;
   sending, by the first server, the user profile and the certificate to a second server; and
   sending, by the first server, a notification to the user device through a messaging service, wherein the notification includes access information for the second server and instructions to retrieve the user profile from the second server using the certificate.

9. The non-transitory, computer-readable medium of claim 8, wherein the notification is sent as a first notification and a second notification, the first notification including a first portion of the second server access information, and the second portion including a second portion of the second server access information.

10. The non-transitory, computer-readable medium of claim 9, wherein
    the second server access information includes a universal resource locator ("URL") associated with the second server,
    the first notification includes a first portion of the URL,
    the second notification includes a second portion of the URL and the unique key, and
    the user device combines the first and second portions of the URL to provide the second server with the unique key and access the user profile.

11. The non-transitory, computer-readable medium of claim 8, the stages further comprising:
    receiving, at the second server, the a request for the user profile from the user device, wherein the request includes the certificate;
    identifying, by the second server, the user profile using the certificate; and
    sending, by the second server, the user profile to the user device.

12. The non-transitory, computer-readable medium of claim 11, wherein the certificate includes a group identifier of the user group associated with the user device, and the identification includes searching one of a storage and a memory of the second server with the group identifier for the associated user profile.

13. The non-transitory, computer-readable medium of claim 11, further comprising:
    verifying, at the second server, that the user device is assigned to the first user group based on the certificate prior to performing the identification.

14. The non-transitory, computer-readable medium of claim 11, the stages further comprising:
    partitioning, by the first server, the user profile into segments;

transmitting each of the segments to a respective designated user device for the user group not including the user device;

transmitting device information corresponding to the designated user devices to the user device; and transmitting, to the user device, instructions for retrieving the user profile segments from the designated user devices and combining the segments.

15. A system for distributing profiles to user devices, comprising:
    a memory storage including a non-transitory, computer-readable medium comprising instructions; and
    a computing device including a hardware-based processor that executes the instructions to carry out stages comprising:
        providing a unique key and a certificate to a user device based on the request, wherein the unique key corresponds to a user group associated with a user of the user device;
        encrypting a user profile with the unique key, wherein the user profile is associated with the user group;
        sending, by the first server, the user profile and the certificate to a second server; and
        sending, by the first server, a notification to the user device through a messaging service, wherein the notification includes access information for the second server and instructions to retrieve the user profile from the second server using the certificate.

16. The system of claim 15, wherein
    the second server access information includes a universal resource locator ("URL") associated with the second server,
    the first notification includes a first portion of the URL,
    the second notification includes a second portion of the URL and the unique key, and
    the user device combines the first and second portions of the URL to provide the second server with the unique key and access the user profile.

17. The system of claim 15, wherein the second server access information includes a first portion of a universal resource locator ("URL") associated with the second server, and wherein a second portion of the URL is provided to the user device with the first unique key by the first server, and wherein the user device combines the first and second portions of the URL to access the second server and provide the second server with the first unique key.

18. The system of claim 15, the stages further comprising:
    receiving, at the second server, the a request for the user profile from the user device, wherein the request includes the certificate;
    identifying, by the second server, the user profile using the certificate; and
    sending, by the second server, the user profile to the user device.

19. The system of claim 18, the stages further comprising:
    verifying, at the second server, that the user device is assigned to the first user group based on the certificate prior to performing the identification.

20. The system of claim 15, further comprising:
    partitioning, by the first server, the user profile into segments;
    transmitting each of the segments to a respective designated user device for the user group not including the user device;
    transmitting device information corresponding to the designated user devices to the user device; and
    transmitting, to the user device, instructions for retrieving the user profile segments from the designated user devices and combining the segments.

* * * * *